Oct. 11, 1949.                W. JAMESON                2,484,409
              SHOVEL STRUCTURE AND SUPPORT THEREFOR
                        Filed Aug. 7, 1946
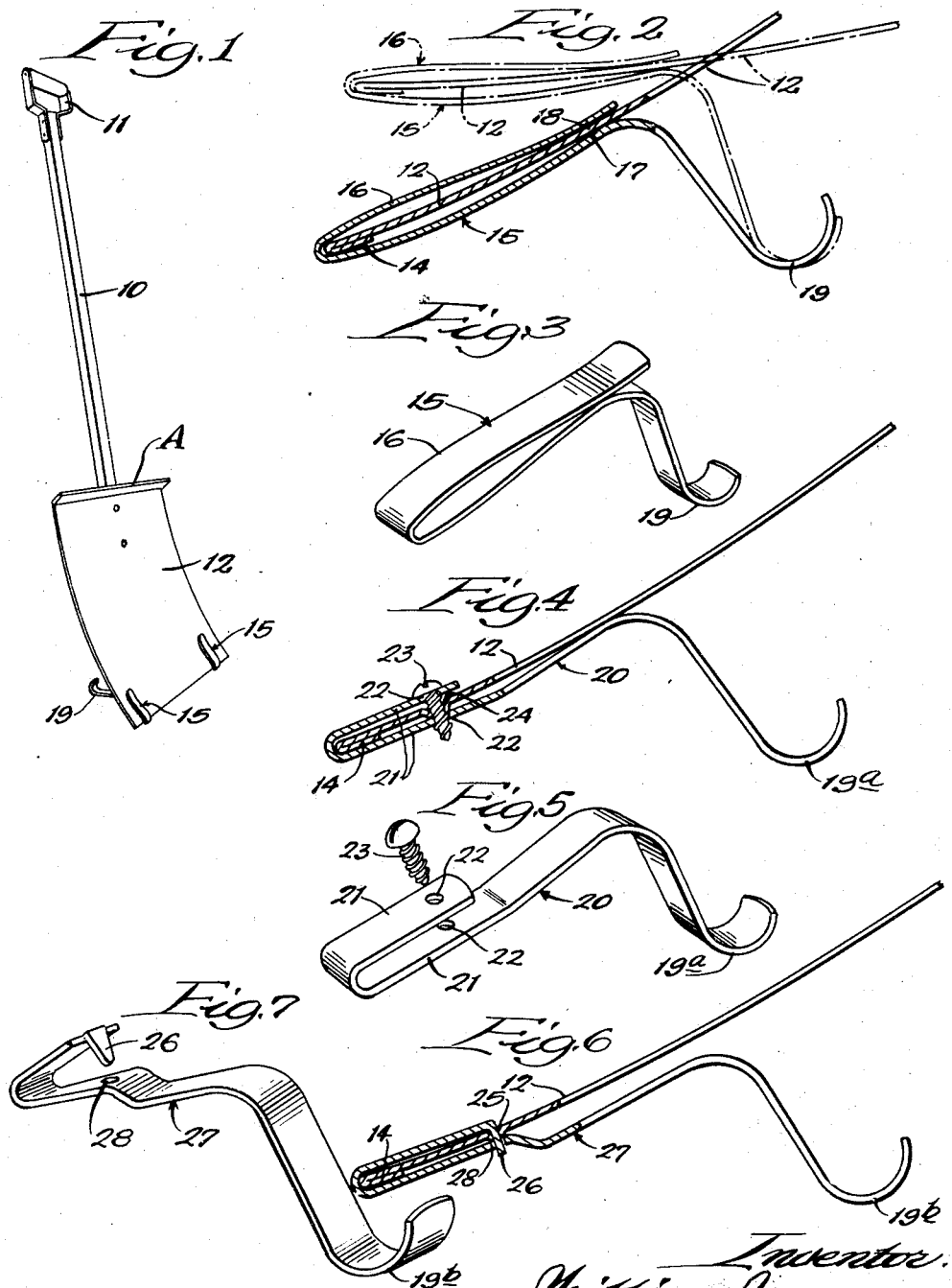

Patented Oct. 11, 1949

2,484,409

UNITED STATES PATENT OFFICE 2,484,409

SHOVEL STRUCTURE AND SUPPORT THEREFOR

William Jameson, Chicago, Ill.

Application August 7, 1946, Serial No. 689,042

3 Claims. (Cl. 294—59)

This invention relates to a shovel structure and support therefor. The invention is particularly useful in connection with a snow shovel and the like and to any type of shovel where the blade is to be moved over a rough surface.

In the shoveling of snow from a gravel roadway or from any other irregular and rough surface, it is found that the blade of the shovel strikes irregular objects and makes the process of shoveling fatiguing and extremely difficult. Further, the snow is removed in irregular amounts, leaving a rough and jagged surface.

An object of the invention is to provide a shovel with means whereby the shovel may be guided above the irregular surface so as to effect the easy removal of snow or other material above the irregular surface and to provide a relatively smooth top surface. Yet another object is to equip a shovel with runners or rocker members whereby the shovel blade can be caused to move with reduced friction over a surface to effect the removal of material above the surface at a selected depth. Yet another object is to provide an attachment member or members which may be readily secured to the blade of the shovel, etc., whereby the shovel can be caused to move at a desired distance above a surface in the removal of snow or other material. Other specific objects and advantages will appear as the specification proceeds.

The invention is illustrated in a preferred embodiment, by the accompanying drawing, in which—

Figure 1 is a perspective view of a shovel equipped with support means embodying my invention; Fig. 2, a side view in elevation and partly in section of the support means secured to the edge of the shovel blade; Fig. 3, a perspective view of the support structure shown in Fig. 2; Fig. 4, a broken side view of a modified form of support releasably secured to the blade of a shovel, a portion of the structure being shown in longitudinal section; Fig. 5, a perspective view of the support structure shown in Fig. 4; Fig. 6, a side view in elevation of another modified form of support structure shown attached to the blade of a shovel, a portion of the structure being shown in longitudinal section; and Fig. 7, a perspective view of the support structure illustrated in Fig. 6, the support structure being removed from the shovel blade.

In the illustration given, A designates a shovel which may be of any suitable type or construction. The shovel A comprises a handle shaft 10 and a handle member 11. Secured to the other end of the handle shaft 10 is a blade 12 which may be of any suitable shape or design. In the illustration given, the blade 12 at its forward end is doubled back upon itself at 14, as illustrated best in Fig. 2.

A pair of support members 15 is shown secured to the forward edge portion of the blade. Each member 15, is illustrated best in Figs. 2 and 3, comprises a looped portion 16 extending about the forward edge of the blade 12 and having opposite portions welded to the blade 12 at 17 and 18. The lower portion of the member 15 is extended downwardly below the shovel blade to provide a rocker or glider portion 19. By means of the rocker portion 19, the shovel may be swung to the elevated position indicated in dotted lines in Fig. 2.

I prefer, however, that the member 15 have the forwardly-extending loop portion 16 which provides an extremely firm anchorage for the glider leg 19 while at the same time reinforcing the forward edge of the blade 12. The member 15 thus protects the forward thin edge of the blade against distortion and bending, while at the same time providing a firm anchor for the glider leg 19.

In the modifications illustrated in Figs. 4 to 7, I provide structures which may be releasably secured to the shovel blade so that the blade may be employed with the supports in the wintertime when snow is to be shoveled, and if it is desired to use the shovel for other purposes, as in shoveling grain, etc., from a smooth surface, the supports may then be readily removed. In the specific structure shown in Figs. 4 and 5, the attachment 20 is provided with a loop portion 21 receiving the forward edge of the blade 12. The loop members 21 are provided with aligned openings 22 through which a self-tapping screw 23 may be passed. The member 20 is provided with a depending leg providing a rocker or glider surface 19a.

In the assembly of the structure shown in Figs. 4 and 5, a nail or other instrument is used to form a hole 24, as illustrated in Fig. 4, and the screw 23 is passed through the openings 22 and through the hole 24 of the blade 12, and in so doing forms a thread in each of these members. If desired, the openings 22 of the loop member 12 may be pre-threaded, and the screw 23 may be employed for tapping only the walls about the opening 24 in the blade 12. When it is desired to remove the structure 20 from the blade 12, it is merely necessary to unscrew the screw 23 and slip the members 20 off the edge of the blade.

The shovel A has been shown equipped with a pair of supports 15. It will be understood that a single support may be used or any number greater than two may, if desired, be used. In the operation of the structures, whether one or more are employed, it is found that the operator can raise or lower the shovel blade at any desired distance so as to cut the snow or other material to any selected depth by merely tilting the handle 11. When the handle 11 is swung downwardly, the forward edge of the blade is raised, and when the handle 11 is raised, the blade edge moves nearer the surface upon which the glider portions 19 rest. In the actual shoveling operation, the operator is thus able to remove the snow or other material to a selected level above the surface so as to provide a smooth top surface, while at the same time the glider members 19 greatly reduce the friction of the shovel blade so that the operation is much less fatiguing. The structures 20 and 27 may be readily attached to the shovel blades 12 and, when desired, may be readily detached therefrom.

In the modification illustrated in Figs. 6 and 7, the blade 12 is provided with an opening 25, and the depending point 26 of the attachment 27 is driven through the opening 25 and through the aligned opening 28 in the lower leg of the member 27. The member 27 is also provided with a rocker or glider member 19ᵇ.

While I have illustrated a few methods for the attachment of the rocker or glider support, it will be understood that the connection may be made in a great variety of ways and the structure may be formed in a great number of shapes and designs. The structures set out are merely for the purpose of illustrating modes in which the invention may be applied and it will be understood that the details set out may be varied widely by those skilled in the art without departing from the spirit of my invention.

I claim:

1. In combination, a shovel equipped with a blade and a spring member extending about the front edge of the blade and gripping the blade between the member portions at a point rearwardly of the front edge, said member on the lower side of the blade being extended downwardly and terminating in a rocker foot.

2. In combination, a shovel equipped with a blade and a member having a loop portion extending about the front edge of the blade, and fastening means extending through the loop portion of said member and said blade at a point rearwardly of the front edge of the blade to secure said member to said blade, said member being provided on its underside with an extension extending downwardly and terminating in a rocker foot.

3. A support attachment for a shovel blade, and the like, comprising a spring member having a portion bent upon itself to provide a clip adapted to engage the forward edge of the blade, said clip pressing against the blade at the upper and lower surfaces thereof and at a point rearwardly of the edge, said member having a depending leg extending downwardly from said blade and terminating in a rocker foot.

WILLIAM JAMESON.

REFERENCES CITED

The following references are of record in the file of this patent:

UNITED STATES PATENTS

| Number | Name | Date |
|---|---|---|
| 738,057 | O'Connor | Sept. 1, 1903 |
| 815,122 | Schaffert | Mar. 13, 1906 |
| 838,498 | Clark | Dec. 11, 1906 |

FOREIGN PATENTS

| Number | Country | Date |
|---|---|---|
| 102,095 | Sweden | July 22, 1941 |